(No Model.)

C. W. BILDT.
ART OF TREATING WIRE RODS.

No. 459,903. Patented Sept. 22, 1891.

Witnesses;
Walter B. Nourse.
C. Forrest Wilson.

Inventor;
Carl W Bildt
By A. A. Barker Atty

UNITED STATES PATENT OFFICE.

CARL WILHELM BILDT, OF WORCESTER, MASSACHUSETTS.

ART OF TREATING WIRE RODS.

SPECIFICATION forming part of Letters Patent No. 459,903, dated September 22, 1891.

Application filed November 22, 1890. Serial No. 372,322. (No model.)

*To all whom it may concern:*

Be it known that I, CARL WILHELM BILDT, of the city and county of Worcester, and State of Massachusetts, have invented certain new and useful Improvements in the Art of Treating Wire Rods; and I do hereby declare that the following is a full, clear, and exact description thereof, reference being had to the accompanying drawings, forming a part of this specification, and in which—

Figure 1:
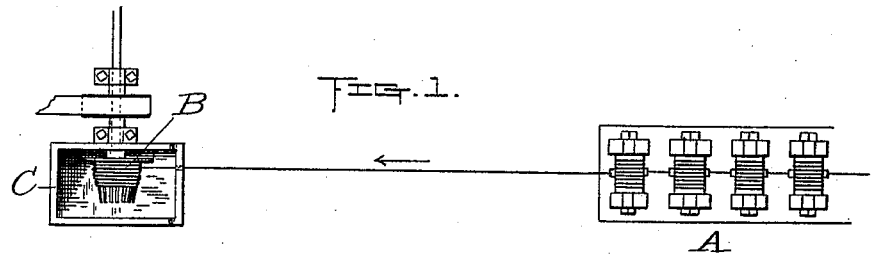
Figure 2:
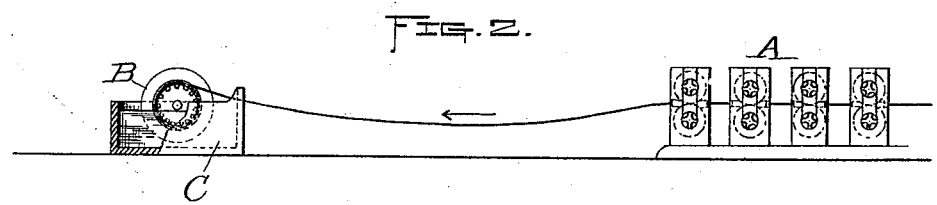
Figures 3, 4:
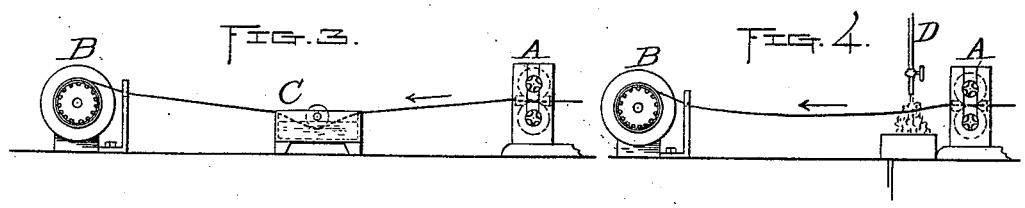

Figure 1 represents a plan of so much of a wire-rod-rolling mill and its receiving-reel as is necessary to illustrate my said improved art or process. Fig. 2 is a side view thereof, partly in section; and Figs. 3 and 4 are modifications, which will be hereinafter more fully described.

My invention relates to the manufacture of iron and low carbon steel-wire rods; and it consists in passing said wire rods, as fast as delivered from the rolling-mill, and while still in a red-hot state, through a body of water as they are continuously drawn forward and coiled upon the reel, as and for the purpose hereinafter more fully set forth.

As is well known, the common way has heretofore been to reel the rods dry as fast as delivered from the rolling-mill and then taken from the reel hot in coils and piled up in large quantities. By this process of slow cooling the rods become very scaly and one part of the coil cools off faster than another part thereof, thus causing a great unevenness in the hardness or texture of each coil. It is also well understood that the more scaly the rods are the more acid is required to clean the same and that acid has a very injurious effect on the quality of iron and steel, the use of acid causing it to become more or less brittle and crystallized, according to the quantity used, and also causing the surface of the rods to become rough or "pitted." This objection may be overcome by reeling the hot rods in water or by passing said rods through a body of water just prior to reeling as they leave the rolling-mill. By immersion in water while still red hot the scaling process is arrested, and what little scale has formed on the rods prior to entering the water drops off on account of the contraction caused by the sudden cooling thereof and leaves said rods comparatively clean from scale and with a smooth surface, consequently requiring but little acid to properly clean the same preparatory to the usual coating and drawing operations, and after drawing producing a well-finished wire, which will readily copper, tin, or galvanize.

Referring to Figs. 1 and 2 of the drawings, A represents part of a rolling-mill, B the reel upon which the wire rods are coiled as fast as delivered from said rolling-mill, and C is a tank containing water and in which said receiving-reel B is arranged, the lower part thereof being submerged in the water, as is indicated in Fig. 2, so as to pass the wire rods through said water to cool and clean the same as they are coiled upon said reel.

If preferred, instead of arranging the reel in the tank, as above described, said tank may be interposed between the rolling-mill and its reel and the rods passed through the water prior to reeling, as is indicated in Fig. 3; or, instead of a tank, a stream of water may be poured upon the rods from a supply-pipe D, as is indicated in Fig. 4, the main or essential object being to subject the rods to said water bath immediately upon their passage from the rolling-mill and while in a red-hot state as the rods are continuously drawn forward and coiled upon the receiving-reel. Said treatment of this class of wire rods not only causes the same to be cleaned, as aforesaid, but also, by being cooled uniformly, results in a product of uniform hardness or texture. These facts I have fully demonstrated in practice in the treatment of many tons of wire rods, and I have also ascertained that a very large saving in acid is effected, it requiring but little acid, as before stated, to properly clean the rods for coating after having been thus treated. Therefore a corresponding saving in cost is also effected, while at the same time the product is of superior quality.

Having now fully described my improved art or process, what I claim as new, and desire to secure by Letters Patent, is—

The improvement in the art of treating wire rods, consisting in passing said wire rods as fast as delivered from the rolling-mill and while still in a red-hot state through a body of water as they are continuously drawn forward and coiled upon the receiving-reel, substantially as and for the purpose set forth.

CARL WILHELM BILDT.

Witnesses:
A. A. BARKER,
W. B. NOURSE.